(12) United States Patent
Hansmann et al.

(10) Patent No.: US 7,055,041 B1
(45) Date of Patent: May 30, 2006

(54) CONTROLLED USE OF DEVICES

(75) Inventors: Uwe Hansmann, Altdorf (DE); Lothar Merk, Wiel i. Sch. (DE); Thomas Stober, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 09/666,255

(22) Filed: Sep. 21, 2000

(30) Foreign Application Priority Data

Sep. 24, 1999 (DE) .............................. 99 118 909

(51) Int. Cl.
*G06F 9/00* (2006.01)
(52) U.S. Cl. ...................... 713/201; 713/202; 713/169; 713/171
(58) Field of Classification Search ................ 713/202, 713/201, 169, 171
See application file for complete search history.

(56) References Cited

U.S. PATENT DOCUMENTS

| | | | |
|---|---|---|---|
| 5,721,781 A * | 2/1998 | Deo et al. ...................... 705/67 |
| 5,936,660 A * | 8/1999 | Gurantz ........................ 725/71 |
| 6,223,348 B1* | 4/2001 | Hayes et al. ................. 725/152 |
| 6,647,270 B1* | 11/2003 | Himmelstein ............ 455/456.1 |

* cited by examiner

*Primary Examiner*—Norman M. Wright
(74) *Attorney, Agent, or Firm*—Thomas A. Beck; Louis P. Herzberg

(57) ABSTRACT

A method for selectively controlling the operation of a device for authenticating a user. The user may have a multifunction smart card that is capable of downloading and executing programs, based upon personal and authentication account data, which is selectably stored on the smart card.

19 Claims, 2 Drawing Sheets

CONTROLLED USE OF DEVICES

BACKGROUND OF THE INVENTION

1. Area of the Invention

The present invention relates to method and system for controlling the use of devices which are controlled by an electric or an electronic circuit. In particular, the present invention relates to such method and system for selectively controlling specific types of operation of such devices.

2. Disadvantages of Prior Art

The above mentioned term 'device' should be understood in context with the inventive concepts presented in here as very broad and general. Basically, a broad variety of devices can be subjected to the method of the present invention and their use or their operation can be selectively controlled by it.

In general, many electronically controllable devices are provided with an on/off switch in order to enable the device for operation. If the use of a device is sensible for questions of data security or access, in general, the device is protected with an access control system which a person intending to use the device has to pass prior using it.

For example, a prior art method and system for controlling the personal use of a device can be a TV device being connected to a Pay-TV channel access system via a set-top box. The Set-top box acts as an access control system and provides card reader unit for authenticating any registered user. After being identified a user can freely access the Pay-TV channels.

A disadvantage of this kind of control can be seen in the fact, that the use of the device is either admitted—in total—or it is restricted in total. There are not provided any possibilities of defining selected types of operation and specifying individual constraints of usage for a specific device. Such sophisticated access control logic would require intelligent back-end systems with some sort of a user management system. The possibility to allow a selected type of operation and certain constraints of usage, however, is desirable for devices in many cases—even in such cases in which a device is not provided with any access control system and no user management infrastructure at all. For example, a common TV device can only be locked into a cupboard, so the access to the TV is prevented generally, when the cupboard is locked, and such desired selective type of device operation is only possible with an adult person surveying the children's TV-channel selection.

In this case, however, the use of the TV device would be desired for children only during predetermined intervals of time, at specific days and on specific channels, in addition only a specific total time of watching television in a week could be desirable.

Different devices have always different procedures of controlling their operation. In case of a car sharing company it is difficult to control the duration of time in which the car is used by a client. As the duration of such use can be considered as a basic requirement for the client's bill an exact determination of said duration of device operation would be desirable.

OBJECTS OF THE PRESENT INVENTION

It is thus a general aim of the present invention to provide a method and system for controlling the personal use of devices the operation of which is controllable by an electronic control circuit in which the method allows some kind of user-related and/or user-initiated selection of different types of operation of the respective device whenever more than one type of operation is provided for the device or makes sense with the device.

It is a further object of the present invention to provide such decentralized method and system such that using the method or system will be comfortable for the user and universally to apply for a plurality of devices of the same type without needing to establish a sophisticated user management infrastructure.

SUMMARY AND ADVANTAGES OF THE PRESENT INVENTION

According to the invention a method and system for selectively controlling the operation of the device is provided which uses some kind of personal authentication token, e.g., a JAVACard connected to said device in order to control a particular type of use or the duration of use of the device, and—if desired—in order to interrupt the operation of the device or to delimit the operation when some kind of reason can be evaluated from some operation type specific or some user-related data stored in said card which might justify said decision.

According to a preferred aspect of the present invention said token or, generally spoken, an authentication means is advantageously a Smartcard and in particular a Java Card, or any other multi function smart card with the capability of downloading and executing software programs on the card, on which personal authentication data as well as some kind of account data are stored. Said account can be a time account in which the duration of the personal use and/or operation of the device is maintained and regularly compared to some predetermined time limits admitted to the user.

A large variety of further criteria storable on the card emerge dependent of the type of the device. In case of a TV device the Smartcard advantageously holds program data which specify date and time during which a child for example is allowed to watch the program of some predefined TV channels. Alternatively, some film rating data can be stored on the card and can be subjected to an evaluation which uses amongst others further data as, for example, the age of the child the Smartcard is associated with in order to provide a result if a user-selected, e.g. child-selected type of operation will be admitted to the child or not. In addition to that an identifier for a specific TV show could be stored, which the user is permitted to watch. Many further limitations of use are obvious such as, for example, the limitation of the duration of use.

According to a further preferred aspect of the present invention the logic which evaluates the above mentioned data is located at least partly on the Smartcard and provides a device operation control logic with a signal which is able to filter some admitted types of operation—if desired. An advantage of this solution is that one Smartcard can be used for a plurality of different devices holding the hardware extensions required for the devices on a minimum level. Thus, the overall costs for the system consisting of Smartcards and a plurality of devices is held low. According to a further preferred aspect of the present invention the Smartcards belonging to the users are programmable by a Master-SmardCard. Dependent of the type of device any criteria can be stored on the Smartcards subordinated to said Master-SmartCard by aid of a program which can only be invoked when a user invokes it who has run successfully an authentication procedure which acknowledges his status as a superuser.

For the sake of improved security further security mechanisms may be provided with this solution as, for example, input and control of a superuser-ID and an associated password, as it is known in prior art.

The preferred location of said program depends on the type of the device and depends further on the complexity of operation control. It can be located on the devices, programmed in a ROM memory as a part of an electronic circuit connectable with the Smartcard reader associated to the device.

It is obvious that for example for the sake of economy of the total control system the composition of the arrangement—i.e., the plurality of controllable devices, the plurality of subordinated Smartcards, the plurality of Master-Smartcards, the spatial or geographic distance between the devices, the business value of the devices, the costs for equipping already existing devices with the hardware and software system according to the present invention, etc. have to be considered carefully in order to implement an individual 'best-fit' solution.

Further, the control logic can be distributed on more than one location, i.e. a part of it can be located on the Smartcard, another part can be located for example as a hardware implementation of a piece of software in the device itself according to the above mentioned criteria.

A general advantage of the present invention's concepts is that the control system is very flexible such that the use of a device can be individually controlled according to a plurality of device specific criteria. When all data which is necessary to control the operation of one or a plurality of devices are stored on the user-associated Smartcard it is sufficient to provide each user with one Smartcard only, instead of a variety of cards for respective devices. Then, only one Smartcard per user is applicable and insertable into Smartcard readers corresponding to a respective plurality of devices without being obliged to transfer personal, operation-related data from one device to the next. In other words, in a family where are three TV devices one child needs only one Smartcard and not one Smartcard for each TV device. The total duration of watching TV which was limited before for the child is stored and updated according to the child's TV consumption in the memory of the child's card—independent of the number of TV devices used by the child.

Further, when the logic is concentrated on the Smartcard, any changes related to the hardware of the device do not influence the operation of the control system. And finally, when the logic of the criteria is changed the devices need not to be changed in the most cases.

BRIEF DESCRIPTION OF THE DRAWINGS

The present invention is illustrated by way of example and is not limited by the shape of the figures of the accompanying drawings in which.

DETAILED DESCRIPTION OF THE PREFERRED EMBODIMENT

Figure 1:
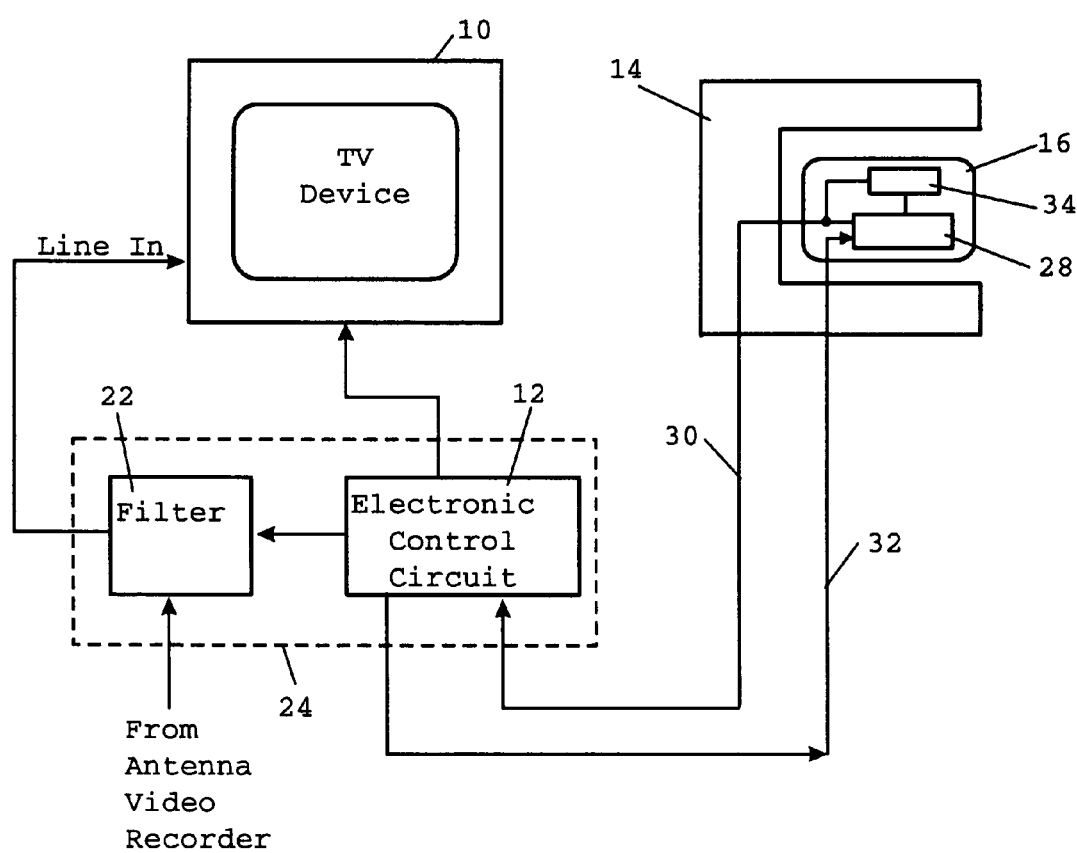
FIG. 1 shows an example schematic block diagram comprising the most relevant components of a preferred embodiment of the present invention in form of a TV device the operation of which is controlled according to the present invention's method.

With reference to FIG. 1 an example arrangement according to the present invention is shown with which the inventive method can be performed in order to control the personal use of a TV device. A TV device 10 is connected with and controlled by an electronic control circuit 12 incorporated in its casing. The electronic circuit 12 is able to control the operation of the TV device such that it can switch it on or off in order to let the user watch the current programs available.

According to the present invention the electronic control circuit 12 is connected to a Smartcard reader 14 which can read and process data and commands provided from a Smartcard 16 inserted therein. Said Smartcard is assumed to belong to a certain user who is a child of eleven years living in a family and a household having a plurality of three TV devices in total. According to the principles of the present invention it is some aim of it to control the personal use of devices, such as the TV device depicted in FIG. 1. In order to be able to exhibit this function said Smartcard 16 has stored in its memory a user ID associated with the child and a list of TV emissions which the parents allow to be watched by the child. Further, there is stored a time account which reflects the total duration of time in which the child watches TV during a predetermined time interval, e.g., one week. For example, the child is allowed to watch TV for a total duration of 180 minutes per week. Further, there is stored in the memory of the Smartcard some additional data which serves as additional criteria in order to restrict the child from watching TV late in the evening, for example to prevent the child from watching some films showing too much of violence, sex, crime, etc.

Further, the Smartcard is provided with an integrated microprocessor and advantageously with some Smartcard application, so-called applets, in order to process the data stored in its memory and to compare them with data read from the TV device. This, however is described in more detail with reference to FIG. 2 later below.

With reference back to the electronic control circuit 12 connected to the TV device 10, said circuit is connected to a filter 22 which is interconnected between the antenna or video recorder, in general, between program source and the input port for the TV signal.

The electronic control circuit 12 can be incorporated into the casing of the TV device, as well as the filter 22. Alternatively, one of them, or both can be put into a small box to be connected with the TV and a Smartcard reader unit.

Alternatively, the Smartcard Reader 14 and the control circuit 12 and the filter 22 can be incorporated in the TV device, as well as assembled in said box connectable with the TV device. Or, the Smartcard reader 14 could be excluded from the arrangement 24 such as being external to it for improve flexibility. This is depicted in FIG. 1 with the arrangement 24 surrounded by broken lines. The communication between arrangement 24 and the Smartcard reader 14, or connector for any other secure token, could be secured by the use of encryption for the data transmitted as well as by sealing the physical connectors.

In any of the above mentioned variations some connection between the remote control unit associated with the TV device will be advantageously provided in order to let the user comfortably select the channel, etc. by aid of the remote control unit.

Figure 2:
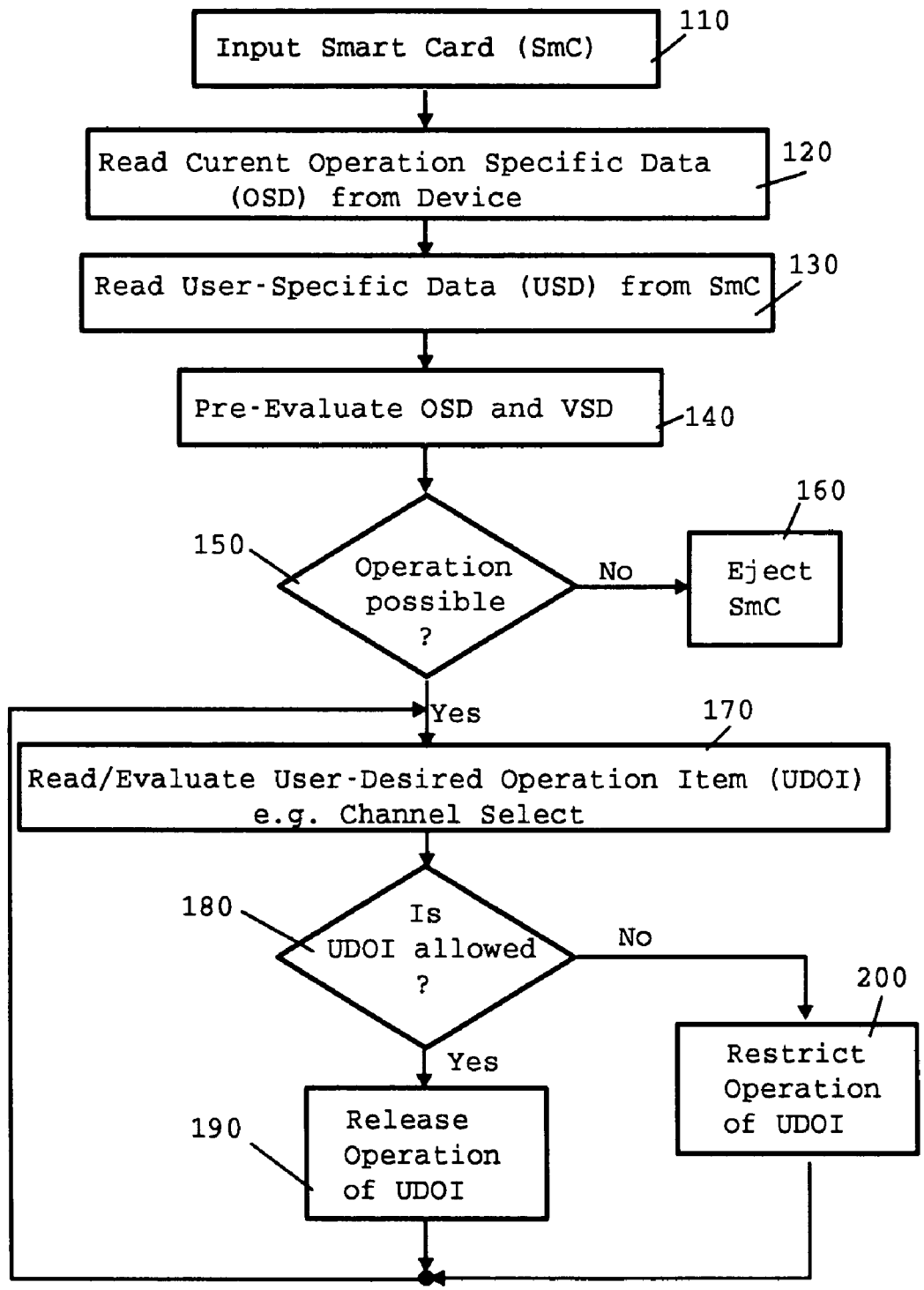
FIG. 2 is a flow chart showing the basic steps and decisions of a preferred embodiment of the method of the present invention when a user wants to watch TV with reference to the system depicted in FIG. 1.

In order to do this, the box is provided with an infrared sensor and a respective signal receiving unit in order to receive the control signal from the remote control unit and pass it to the electronic control circuit for processing which is described in more detail later below with reference to steps 170, 180, . . . of FIG. 2.

Alternatively, the signal from the remote control unit can be received by the sensor circuit incorporated in the TV. Then, however, at most the channel-select signal is fed from said circuit to the electronic control device external to the TV for performing the same evaluation as stated above.

Advantageously, any electrical connection between said external arrangement 24 and the TV device as well as the Smartcard reader can be sealed in order make any interruption or switch off of the arrangement 24 visible to the parents of the child.

With additional reference now to FIG. 2 a preferred embodiment of the inventive method will be described in more detail which will illustrate as well the operation of the inventive arrangement depicted in FIG. 1.

The eleven year old child wants to start watching TV. Thus he inserts his personal Smartcard 16 into the Smartcard reader 14 in a step 110. In this particular embodiment the on/off switch of either the TV device itself or that of the remote control can be operated only when a Smartcard is inserted into said Smartcard reader. Thus, an activation signal is fed from an operation control logic circuit 28 placed on the Smartcard, in order to activate the electronic control circuit 12 for preparing the begin of operation of the TV device. Said activation signal is fed via line 30.

Activation is further confirmed to said operation control logic via a line 32 connected between electronic control circuit 12 and Smartcard reader 14 as well. This is depicted in FIG. 1.

Next, in a step 120 some current operation specific data, further referred to as SOD is read from the device into the control logic 28 in order to be processed by said logic. In this particular case said SOD comprises current date and current time. Further, it comprises a flag, indicating if a video signal from a video recorder possibly connected with the TV device is present on its signal input line.

Next, in a step 130, so called 'user-specific data' further referred to as US are read from the Smartcard memory 34 in order to identify the person intending to watch TV. At least, said US comprises a unique user-ID, at least unique in the family. Thus, the control logic 28 recognizes, that the eleven year old child wants to start watching TV.

In order to perform the selectively controlled use of the TV device said logic 28 pre-evaluates in a step 140 US and SOD according to some preprogrammed data and with the help of some applet stored in the memory 34 of the Smartcard. In particular, during said pre-evaluation it is checked for a decision 150 if there is time enough resting on the time account of the card, and the current time of day is checked as well. If it is too late in the evening or during the night, or if there is no more time left in the time account, the card is ejected—step 160—from the slot and watching TV is prohibited. If yes, the child is basically allowed to watch TV and can select a TV-channel—step 170 described in more detail below. A more specific and selective evaluation of the user's choice will be performed after said selection of TV input, i.e., the TV channel number or the actuation of a switch for input of a video signal from a connected video recorder.

Said preprogrammed data was programmed before by the child's parents, e.g., using a Mastercard provided with a secret key only known to the parents in order to provide the child's Smartcard with data describing and determining TV emissions which he is allowed to watch. In particular, advantageously a TV channel number and associated emission time, or, alternatively, the show view code of emissions can be stored on the card, and it can be specified if watching it shall be allowed to the child or not. If the evaluation yields that there is an emission which the child is allowed to watch, in a step 150 a corresponding 'device-enable' signal is fed from the control logic 28 into the electronic control circuit 12 in order to prepare the TV device for operation.

With reference to step 170 a user action is expected. The user action can for example be pushing a respective channel-select button located on the remote control of the TV device, or, alternatively, pressing the corresponding button on the device's operation console. Further, said user action can be pressing the button which selects a video recorder connected to the TV device. Any of them is understood for the purposes of the present invention's disclosure as a 'User-Desired Operation Item', further referred to as UDOI. It is assumed now that the user presses the channel-select button 2 on the remote control. Thus, a UDOI is defined. Further, it shall be assumed that the current time is 3.30 p.m.

The electronic control circuit 12 feeds back the user's choice to the operation control logic 28 placed on the Smartcard 16 via line 32 and said signal is read in a step 170 by said control logic. An algorithm preprogrammed in said operation control logic 28 compares the user choice with the list of admitted operation items which were in turn preprogrammed before by the parents of the child. In practice, such an evaluation 170 can be performed by a plurality of 'IF'-statements which are checked subsequently.

Then, in a decision 180 a YES-or RELEASE-signal is output when there is found a film inside the allowed film list and the selected UDOI is released, the film can be watched as depicted in step 190. Or, in the no-branch of decision 180 the desired operation item (UDOI) of the TV device is restricted—step 200, if no pair of channel-number and current time fits to the allowed list data stored on the child's Smartcard.

Then, the system is ready for further user inputs, for example in order to change the program channel or to switch off the TV device.

When the child watches TV the time account stored on the Smartcard is updated regularly in periodic intervals of time, as e.g. every one minute. To do this, the output of a timer device not depicted in FIG. 1 is regularly read by the operation control logic 28 via line 30, and the time data is fed via line 32 to the logic 28, which in turn accumulates the time spent for watching TV on the time account of the child.

If, for example, the maximum time which the child was admitted to watch TV has exceeded, the operation of the TV will be broken. Some warnings can be put out via the screen of the TV device at regular intervals in order to prepare the child and to inform it before the operation is switched off.

It is obvious that the inventive concepts are very broadly applicable. The devices mentioned in the text of the present application can be any device having an electronic or electric control circuit which switches the operation on or off, or, depending of the type of the device, which enables a specific, selective type of operation of that device. Examples of specific operation types or operation items are: selecting a particular channel-number for watching TV,
  selecting a video recorder for feeding the input-signal for the TV. Further, when the device is a computer said selected type of operation can advantageously be the invocation of one of a subset of programs installed on the hard-disk of the computer itself or in the network to which a computer is connected with.

When the device is a car belonging to a car sharing company the duration of use can be easily controlled by the company. In this example, however, there is generally only one type of operation of the car, i.e. to go with the car with a running motor. In this example however, an extension can be included when the car is coupled to the GPS-system which enables the car sharing company to control the position of the car and, eventually the direction in which it is moved on a large scale. Then, a second type of operation could be established, namely, not to enter into a predetermined geographical region, or, to move the car only in predetermined large scale-directions. The same applies of course for companies which are renting cars to people.

The inventive method can be advantageously applied even for allowing selective use of operation of a plurality of computers. This can be required in a company having many employees and a large number of desktop computers and notebooks forming a part of the company's network, when the employees have often to change their desks and are constraint to make their job with the help of different computers, i.e., they use not a personal computer, but an 'unpersonalized' form by that kind of rotation of working sites. In this exemplary situation, the access to the computer's programs or local disk areas can be selectively allowed, or restricted, respectively, while the data for doing said are stored on the card only and not in the computer.

The present invention can be realized in hardware, software, or a combination of hardware and software. A typical combination of hardware and software could be a Smartcard with an applet or any other software running on the Smartcard in more or less close interaction with a piece of software implemented in the device or associated to it, that, when being executed, controls the Smartcard such that it carries out the methods described herein. The present invention can also be embedded in a computer program product, which comprises all the features enabling the implementation of the methods described herein to SmartCards in order to upgrade them in order to carry out the inventive method as a whole or partly. Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

In particular, the control logic required to perform the selective operation types of the device can be located in the Smartcard—or it can be distributed between Smartcard and the device, or, if suited, it can be combined with any logic being installed on the interface means, as e.g., the Smartcard reader.

Further, the inventive concepts are obviously extendible with mechanisms in order to update the user's authentication means as e.g. a Smartcard with new data—e.g. for refreshing the time account, or for automatically load new show-view Codes for admitted emissions.

Further, account data can comprise cash data, too. Cash data can be updated by any mechanism suited, as e.g. in cooperation with a banking software, a cash dispenser, etc., or in direct contact with the owner of the devices to be controlled. Thus, it is possible to allow a selective use of the device only when the user has paid for it.

It is obvious that many scenarios exist in which combinations of one or more of the before mentioned aspects combine in order to provide a best-fit solution of the inventive concepts. It is thus noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The objects of the invention are achieved by the features stated in enclosed independent claims. Further advantageous arrangements and embodiments of the invention are set forth in the respective dependent claims.

What is claimed is:

1. A method for selectively controlling personal use of a device having an operation which is controllable by an electronic control circuit, comprising the steps of:

using said electronic control circuit to control the use of said device using user-related data and/or user initiated data to select different types of operations, said electronic control circuit being controlled by a personal authentication token and which data is processed by a device operation control logic, said user related data on said personal authentication token comprising selective information concerning a user-desired type of operation of said device wherein logic which evaluates said data is located at least partly on said personal identification token and provides said device operation control logic with a signal which is able to filter some permitted types of operations, thereby allowing the user access to said device and other options emanating from the control logic embedded in said personal authentication token, with security levels as between said device and said personal authentication token being controlled by said personal authentication token, reading operation type specific data from said device for processing by said device operation control logic with the result that the data is user-related data stored on the personal authentication token and is maintained in the possession of the user, processing both data for providing a result, deciding according to said result if a desired user-type of operation of said device will be allowed or not, and enabling or preventing said desired type of operation of said device according to said decision.

2. The method according to claim 1 in which said step of processing user-related data and operation type specific data is performed at least partly on said user associated authentication means by means of computing resources comprising said user-associated authentication means.

3. The method according to claim 2 comprising the step of comparing current time information read from said device to predetermined time limits stored on said user authentication means for delimiting the duration of operation of said device.

4. The method according to claim 3, for selectively controlling operation of TV devices where the step of reading operation type specific data comprises reading at least one of: current date, current time, available channels, show-view-codes.

5. A program storage device readable by machine, tangible embodying a program of instruction executable by the machine to perform method steps for causing controlled personal use of a device having operation which is controllable by an electronic control circuit, said method steps comprising the steps of claim 4.

6. The method according to claim 3 used for selectively controlling operation of cars where the step of reading operation type specific data comprises reading at least one of: current date, current time, geographic position via a GPS interface, accumulated duration of use in a predetermined time interval.

7. A program storage device readable by machine, tangible embodying a program of instruction executable by the machine to perform method steps for causing controlled personal use of a device having operation which is controllable by an electronic control circuit, said method steps comprising the steps of claim 6.

8. The method according to claim 3 for selectively controlling operation of at least one computer device.

9. An article of manufacture comprising a computer usable medium having computer readable program code means embodied therein for causing controlled personal use of a device having operation which is controllable by an electronic control circuit, the computer readable program code means in said article of manufacture comprising computer readable program code means for causing the computer to effect the steps of claim 3.

10. An article of manufacture comprising a computer usable medium having computer readable program code means embodied therein for causing controlled personal use of a device having operation which is controllable by an electronic control circuit, the computer readable program code means in said article of manufacture comprising computer readable program code means for causing the computer to effect the steps of claim 2.

11. A device, the operation of which is controllable by an electronic control circuit, and being used as a controllable object according to the method according to claim 1.

12. A user-authentication means arranged for interaction with an operation control logic for a device to as defined in claim 11.

13. The user-authentication means according to claim 12, being incorporated in a Smartcard.

14. The user-authentication means according to claim 13, wherein said Smartcard being selected from a Java™ card, a Smartcard for Windows™, or a Smart card based on the Mult OS™ operating system.

15. Interface means comprising connection means to an electronic control circuit controlling the operation of a device as defined in claim 11 and intended for performing the method steps comprising:

using said electronic control circuit to control the use of said device using user-related data and/or user initiated data to select different types of operations, said electronic control circuit being controlled by a personal authentication token and which data is processed by a device operation control logic, said user related data on said personal authentication token comprising selective information concerning a user-desired tape of operation of said device wherein logic which evaluates said data is located at least partly on said personal identification token and provides said device operation control logic with a signal which is able to filter some permitted types of operations, thereby allowing the user access to said device and other options emanating from the control logic embedded in said personal authentication token, with security levels as between said device and said personal authentication token being controlled by said personal authentication token, reading operation type specific data from said device for processing by said device operation control logic, with the result that the data is user-related data stored on the personal authentication token and is maintained in the possession of the user, processing both data for providing a result, deciding according to said result if a desired user-type of operation of said device will be allowed or not, and enabling or preventing said desired type of operation of said device according to said decision.

16. An interface means according to claim 15, arranged for communicating with user-authentication means arranged for interaction with an operation control logic.

17. Interface means according to claim 16, which is a Set-top box for being added-on a device.

18. An article of manufacture comprising a computer usable medium having computer readable program code means embodied therein for causing controlled personal use of a device having operation which is controllable by an electronic control circuit, the computer readable program code means in said article of manufacture comprising computer readable program code means for causing the computer to effect the steps of claim 1.

19. A program storage device readable by machine, tangible embodying a program of instruction executable by the machine to perform method steps for causing controlled personal use of a device having operation which is controllable by an electronic control circuit, said method steps comprising the steps of claim 1.

* * * * *